UNITED STATES PATENT OFFICE.

RALPH H. McKEE, OF NEW YORK, N. Y.

PROCESS OF MAKING HYDROGEN AND ZINC OXID.

1,355,904.  Specification of Letters Patent.  Patented Oct. 19, 1920.

No Drawing.  Application filed February 9, 1920. Serial No. 357,356.

*To all whom it may concern:*

Be it known that I, RALPH H. McKEE, a citizen of the United States, residing at New York city, in the county of New York and State of New York, have invented certain new and useful Improvements in Processes of Making Hydrogen and Zinc Oxid, of which the following is a specification.

This invention is a novel process whereby I am enabled to produce in a single operation zinc oxid of excellent color and free from unoxidized zinc or "blue-powder," and hydrogen gas, the latter unmixed with oxids of carbon or such other impurities as are highly detrimental for certain purposes, as for example when the hydrogen is to be employed in conjunction with nitrogen for the catalytic synthesis of ammonia. In this last-mentioned operation, for example, it is now well recognized that even minute traces of carbon monoxid in the hydrogen act as catalyst poisons; and it is one of the advantages of my improved process that it yields hydrogen which is substantially pure, even when tested in accordance with the very strict requirements of the ammonia-synthesis process. My process is based upon the known reaction whereby water in vapor phase is deoxidized by metallic zinc in accordance with a reaction which may be expressed as follows:

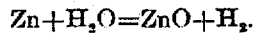
$$Zn + H_2O = ZnO + H_2.$$

As heretofore practised, however, the zinc oxid produced has been of inferior quality, due in part to incomplete oxidation of the metal and in part to objectionable physical characteristics. According to my process I obtain the oxid directly in the form of a fine powder of uniform quality and quite free from unoxidized zinc.

I accomplish this by first vaporizing carbon-free metallic zinc in any suitable furnace of the retort type, in which the vapors of zinc will not be contaminated with oxids of carbon, and then reacting upon the zinc in vapor phase with steam at a suitable temperature and in decided excess of the reaction requirements. This use of steam in excess presents a double advantage, in that first, the excess of steam, acting at a suitable temperature upon the vapors of zinc, effects the complete oxidation of the Zn to ZnO; and second, the unreacted excess of steam, functioning as an inert carrier for the oxid, not only prevents any tendency to the reduction of the oxid by hydrogen through a reversal of the reaction of oxidation, but also brings about the deposition of the zinc oxid in a physical state of minute subdivision which is highly advantageous from the point of view of its commercial uses in paints, etc.

The immediate product of the reaction is a mixture of zinc oxid in minute subdivision, steam and hydrogen. This mixture may be treated in any desired way for the separation of the components. Preferably it is cooled to a temperature somewhat in excess of 100° C. and filtered through bags or equivalent devices, whereby the zinc is directly collected in the form of a dry powder. The mixture of steam with hydrogen is then further cooled in order to condense the steam, leaving the hydrogen in a state of substantial purity.

Other inert gases may be used as diluents to assure the deposition of the zinc oxid in the desirable physical state mentioned above. Of such gases, it is particularly advantageous to employ nitrogen, especially when the hydrogen produced by the reaction is to be utilized in admixture with nitrogen in the ammonia synthesis.

Prior to the introduction of the steam into the vapor of zinc, the former is preferably superheated to or above the temperature of the zinc vapors, the purpose being to avoid any sudden chilling of the latter such as would tend to the precipitation of blue-powder in admixture with the oxid.

It is important for the best results that the reaction whereby the zinc oxid is formed should be wholly with zinc in the vapor phase, since in this way only can an oxid of uniform physical character be obtained. Although zinc in liquid phase will decompose water vapor, the resulting oxid does not possess the desirable characteristics of that derived from the vapor-phase reaction; and if the reaction occurs with zinc partly in the liquid phase and partly in vapor phase, a non-uniform product results.

I claim:—

1. Process of preparing pure zinc oxid and hydrogen free from carbonaceous impurities, comprising bringing substantially pure zinc in vapor phase into reactive relation with steam, the latter in sufficient excess of the reacting proportions to secure substantially complete oxidation of the zinc.

2. Process of preparing pure zinc oxid and hydrogen, comprising bringing zinc in vapor phase into reactive relation with steam, in presence of an inert diluent.

3. Process of preparing pure zinc oxid and hydrogen, comprising bringing zinc in vapor phase into reactive relation with steam, in presence of nitrogen.

In testimony whereof, I affix my signature.

RALPH H. McKEE.